Figure 2:
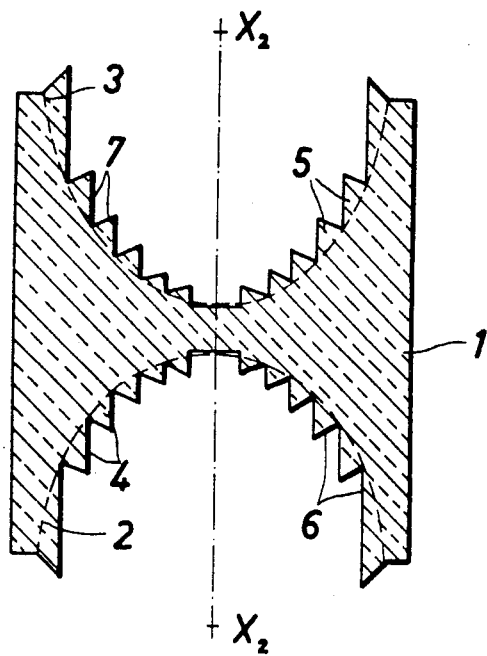

[11] 3,572,903

[72] Inventor Christian Hofmann
Jena, Germany
[21] Appl. No. 831,281
[22] Filed June 6, 1969
[45] Patented Mar. 30, 1971
[73] Assignee Jenoptik Jena G.m.b.H.
Jena, Germany
Continuation-in-part of application Ser. No. 559,686, June 20, 1966, now abandoned.

[54] SPHERICALLY CORRECTED FRESNEL LENSES
1 Claim, 3 Drawing Figs.
[52] U.S. Cl. ............................................. 350/211
[51] Int. Cl. ............................................. G02b 3/08

[50] Field of Search ............................................. 350/211

[56] References Cited
FOREIGN PATENTS
660,352 11/1951 Great Britain ............... 350/211

*Primary Examiner*—John K. Corbin

ABSTRACT: The optically effective face of a Fresnel lens is so shaped that two separate points in its optical axis are imaged without spherical aberration. Said face carries the Fresnel echelons. If there are echelons on both sides of the Fresnel lens, both echelon carrying faces have a form which is defined by an equation.

PATENTED MAR 30 1971 3,572,903

SHEET 1 OF 2

INVENTOR
BY *Christian Orfanany*
ATTORNEY 3,572,903

SPHERICALLY CORRECTED FRESNEL LENSES

CROSS-REFERENCE

This application is a continuation-in-part of my application Ser. No. 559,686, filed on Jun. 20, 1966, now abandoned, and entitled "Fresnel Lenses."

This invention relates to Fresnel lenses having a system of echelons on at least one of their two optically active faces for producing an aberrationless spherical image of two points which are spaced apart in the optical axis.

Known Fresnel lenses which image without spherical aberration a point of the optical axis are not corrected for depth-of-field imaging any more than are aspherical single lenses of the same imaging properties. Such correction is however necessary, for example, in condensers which illuminate the pupils of lenses to be focused at different image scales. Depth-of-field image scales for object points in close proximity to one another are subject to the so-called Herschel condition. This condition, given constant optical path length between object point and image point, ensures aberrationless depth-of-field imaging of closely neighboring points of the optical axis, but it is not satisfied by any aspherical single lens, apart from the insignificant menisci which are concentric with an object point and image this point back into itself.

Fresnel faces satisfying the Herschel condition could be obtained by appropriately bending the base of the active flanks. However, as the Fermat principle does not hold for Fresnel lenses, faces of the said kind fail to produce corrected depth-of-field images.

A converging lens for light projectors which is stigmatic for two points in its axis on the side of the light source has already been disclosed in British Patent specification 660,352. However, that lens would produce stigmatic images only if it were infinitely thin, a condition that cannot be realized. Its application is moreover restricted by the fact that one of the two corrected points is the focus of the lens, which means that no real image will be obtained.

The present invention aims at providing a Fresnel lens of finite thickness having faces by means of which any two object points in the optical axis regardless of the intermediate space between them are imaged without aberration.

To this end the invention consists in a Fresnel lens having optically active faces of such shape that their meridional sections are defined by the mathematical equation $$\frac{n'(h\sin\epsilon' + \alpha'\Delta s \sin\sigma' \sin\varphi)}{(h+\alpha'\Delta s \sin\sigma'\cos\sigma')\sqrt{1+\frac{\alpha'^2(\Delta s)^2\sin^+\sigma'}{(h+\alpha'\Delta s \sin\sigma'\cos\sigma')^2}}} - \frac{n(h\sin\epsilon + \Delta s \sin\sigma \sin\varphi)}{(h+\Delta s \sin\sigma\cos\sigma)\sqrt{1+\frac{(\Delta s)^2\sin^4\sigma}{(h+\Delta s \sin\sigma\cos\sigma)^2}}} = 0 \quad (1)$$

wherein:
- $h$ = height of beam incidence on Fresnel face,
- $n$ = refractive index in object space,
- $n'$ = refractive index in image space,
- $\Delta s$ = distance apart of object points in optical axis,
- $\alpha'$ = depth-of-field image scale,
- $\epsilon$ = angle of beam incidence on Fresnel face,
- $\epsilon'$ = angle of refraction on Fresnel face,
- $\sigma$ = object-side aperture angle,
- $\sigma'$ = image-side aperture angle, and
- $\Phi$ = inclination of active flanks of Fresnel echelons.

The face may contain either the vertices or the bases of the Fresnel echelons. A Fresnel lens having such a face produces aberrationless images without the necessity of satisfying the Herschel principle of constant optical path lengths. For the active flanks of the Fresnel system there holds good the following known relation, expressed in terms of the foregoing symbols:

$$\tan\varphi = \frac{n'\sin\sigma' - n\sin\sigma}{n'\cos\sigma' - n\cos\sigma} \quad (2)$$

If the Fresnel lens is used for imaging two neighboring points in its optical axis, the meridional sections of at least one of the two optical faces are given by the more simple mathematical relationship $$s'^2\sin^2\sigma'\cos\epsilon' - s^2\sin^2\sigma\cos\epsilon = 0 \quad (3)$$

wherein:
- $s$ = object-side intercept length,
- $s'$ = image-side intercept length,
- $\sigma$ = object-side aperture angle, and
- $\sigma'$ = image-side aperture angle.

The manufacture of such lenses is simplified if, in this case, one of the two faces is spherical and concentric with the object point or the image point.

Figure 3:
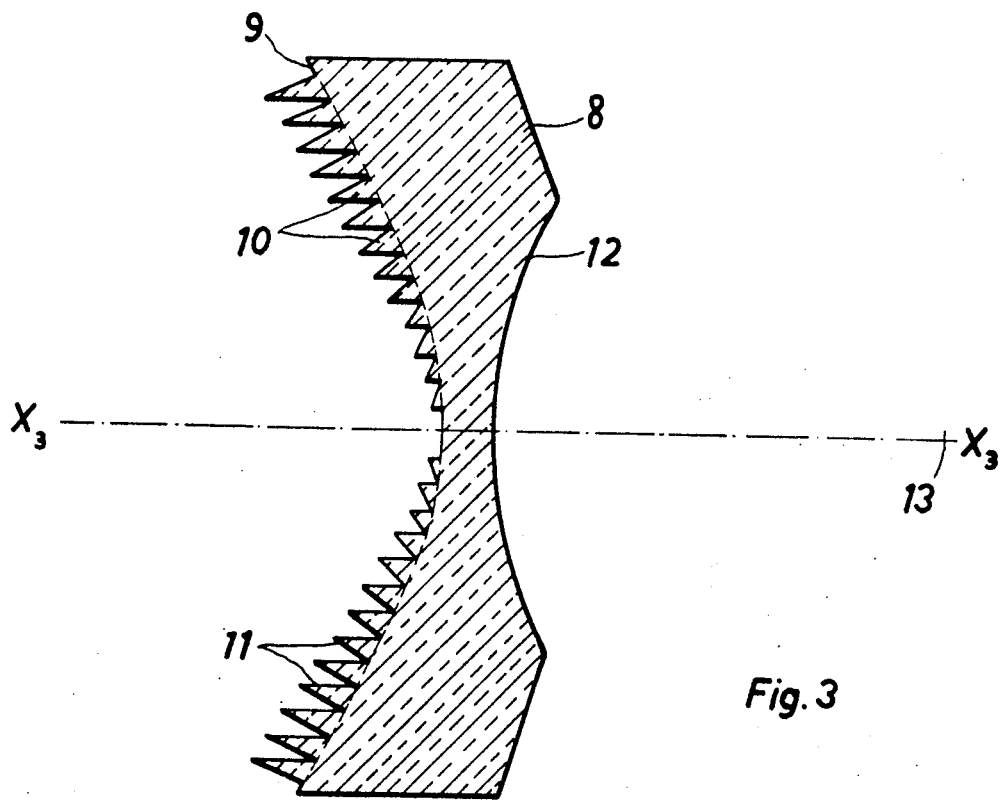
Figure 1:
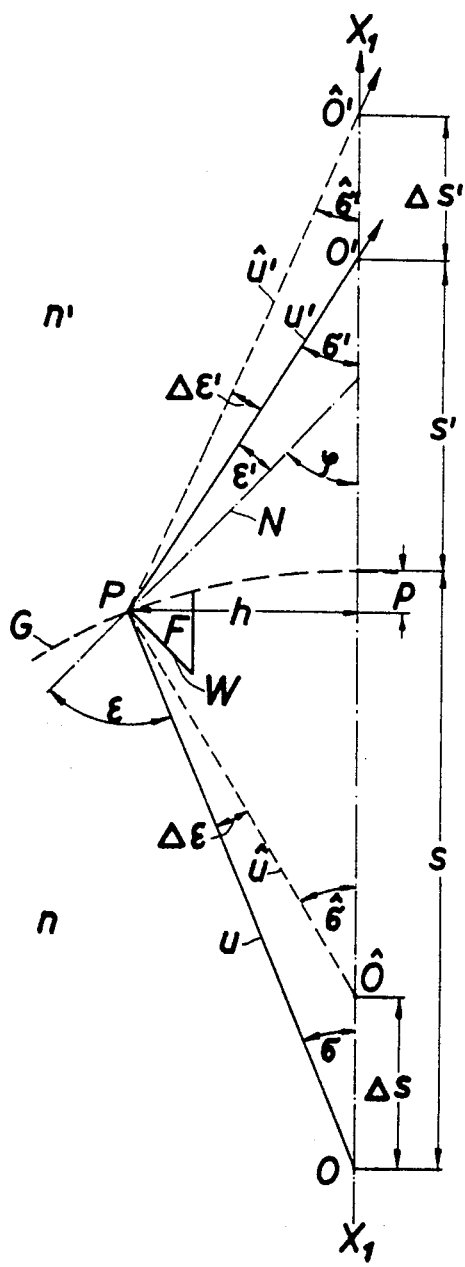

In order that the invention may be more readily understood, reference is made to the accompanying drawings which illustrate diagrammatically and by way of example two embodiments of a Fresnel lens and in which:

FIG. 1 is a graph for explaining the used symbols and for helping to derive the equations defining the faces; and FIGS. 2 and 3 show the meridional sections of the two embodiments.

Referring now more particularly to the drawings, in FIG. 1, a face G bears a Fresnel system made up of echelons F having active flanks W. For the sake of clarity only one such echelon F is shown. The optical axis of the face G is $X_1-X_1$. The point of intersection of the face G and the axis $X_1-X_1$, the vertex of the lens, is designated S. The active flank W intersects the face G at a point P, which is at a distance $h$ from the axis $X_1-X_1$. The distance $h$ is related to the rise $p$ of the face G. A normal N to the active flank W passing through the point P forms an angle $\Phi$ with the axis $X_1-X_1$. The axis $X_1-X_1$ in the object space contains two object points 0 and $\hat{0}$ interspaced $\Delta s$, to which are conjugated respectively two image points $0'$ and $\hat{0}'$ interspaced $\Delta s'$. The refractive indices in the object space and the image space are respectively $n$ and $n'$. The object point 0 and the point of intersection S are spaced apart an amount $s$, which is the object-side intercept length. The image point $0'$ and the point of intersection S are spaced apart an amount $s'$, which is the image-side intercept length. The object points 0 and $\hat{0}$ lie respectively in two aperture beams $u$ and $\hat{u}$, which together with the optical axis $X_1-X_1$ enclose respectively aperture angles $\sigma$ and $\hat{\sigma}$, and which strike the face G at P, where they are refracted to form beams $u'$ and $\hat{u}'$. The beams $\hat{u}'$ and $u'$ accordingly contain the image points $\hat{0}'$ and $0'$ and together with the axis $X_1-X_1$ enclose respectively angles $\sigma'$ and $\hat{\sigma}'$. Moreover, the normal N and the aperture beam $u$ enclose an angle $\epsilon$, and the normal N and the refracted aperture beam $u'$ enclose an angle $\epsilon'$. The aperture beam $u$ and the refracted aperture beam $u'$ enclose an angle $\Delta\epsilon$, and the aperture beam $\hat{u}$ and the refracted aperture beam $\hat{u}'$ enclose an angle $\Delta\epsilon'$.

The derivation of the equation (1) defining the faces sets out from the fact that, expressed in terms of the above-mentioned symbols, $$\tan\Delta\epsilon = \frac{\Delta s \sin^2\sigma}{h + \Delta s \sin\sigma \cos\sigma}$$

in the object space, and $$\tan\Delta\epsilon' = \frac{\Delta s' \sin^2\sigma'}{h + \Delta s' \sin\sigma' \cos\sigma'}$$

in the image space.

Combining the object-space angle $\Delta\epsilon$ and the image-space angle $\Delta\epsilon'$ by the law of refraction in the form $$n\sin(\epsilon + \Delta\epsilon) = n'\sin(\epsilon' + \Delta\epsilon')$$

and considering that the paraxial depth-of-image scale $\alpha'$ is defined by the equation $$\alpha' = \frac{\Delta s'}{\Delta s} = \frac{ns'^2}{n's^2 + \Delta s(n's - ns')}$$

and splitting the relationship of $\tan\Delta\epsilon$ and $\tan\Delta\epsilon'$ to $\sin\Delta\epsilon/\cos\Delta\epsilon$ and $\sin\Delta\epsilon'/\cos\Delta\epsilon'$, and applying the corresponding trigonometrical addition theorems, leads up to the law of refraction in the form corresponding to the equation (1):

$$\frac{n'(h\sin\epsilon' + \alpha'\Delta s \sin\sigma' \sin\varphi)}{(h+\alpha'\Delta s \sin\sigma'\cos\sigma')\sqrt{1+\frac{\alpha'^2(\Delta s)^2 \sin 4\sigma'}{(h+\alpha'\Delta s \sin\sigma'\cos\sigma')^2}}} = \frac{n(h\sin\epsilon + \Delta s \sin\sigma \sin\varphi)}{(h+\Delta s \sin\sigma\cos\sigma)\sqrt{1+\frac{(\Delta s)^2 \sin 4\sigma}{(h+\Delta s \sin\sigma\cos\sigma)^2}}}$$

This is the most general form of the equation defining the face G. A face defined by this or an equivalent equation ensures that any two object points in the optical axis of the Fresnel lens regardless of the space between them are imaged without aberration. Evidently each of the optically active faces of a Fresnel lens in the general case is to conform to the equation (1). If an image point or an object point is at infinity, the first term of the equation (1) is to be replaced by $n' \cdot \sin(\Phi - \hat{\sigma}')$, and the second term by $n \cdot \sin(\Phi - \hat{\sigma})$.

Aberrationless imaging in the particular case of neighboring points in the optical axis permits one to deduce from equation (1) the following equation for the face:

$$s'^2 \sin^2\sigma' \cos\epsilon' = s^2 \sin^2\sigma \cos\epsilon$$

which, given constant optical path length, corresponds to the Herschel condition and which in imaging from and to infinity becomes $$f'^2 = \frac{h^2 \cos\epsilon}{\sin^2\sigma' \cos\epsilon'}$$

$f'$ being the image-space focal length (not shown). Accordingly, there holds good for the object-space focal length $f$:

$$f^2 = \frac{h^2 \cos\epsilon'}{\sin^2\sigma \cos\epsilon}$$

A symmetrical Fresnel lens 1 illustrated in FIG. 2 (not to scale) has faces 2 and 3 and Fresnel systems 4 and 5 having active flanks 6 and 7, respectively. The optical axis of the lens 1 is $X_2$–$X_2$. The faces 2 and 3 are so formed as to satisfy the equation (1).

The following table I shows by way of example the optical data of the Fresnel lens 1 illustrated in FIG. 2. The lens 1 is symmetrical. It has a thickness of 20 mm., a diameter of 4 mm., and a refractive index $n'=1.493$. It images two points of the optical axis $X_2$–$X_2$, which lie in the object space at distances of respectively 19.724 mm. and 5 mm. from the vertex of the face 2, at two points of the optical axis $X_2$–$X_2$ that lie in the image space at distances of respectively 5 mm. and 19.724 mm. from the vertex of the face 3. In the table, $h$, $p$ and $\Phi$ are the coordinates of those points of the Fresnel faces which are shown in FIG. 1. These Cartesian coordinates have been used because they are easiest in the manufacture of the Fresnel face. They can be transformed into angle coordinates, which facilitate the mathematical determination of the face. The Cartesian coordinates $h$, $p$, and $\Phi$ are determined iteratively by continual calculation of the equations in the claims.

TABLE I

| ±h | p | tan φ | ±h | p | tan φ |
|---|---|---|---|---|---|
| 0.00 | 0.00 | −0.000000 | 0.55 | 0.08 | −0.222580 |
| 0.05 | 0.00 | −0.020283 | 0.60 | 0.09 | −0.242698 |
| 0.10 | 0.00 | −0.040564 | 0.65 | 0.11 | −0.262784 |
| 0.15 | 0.00 | −0.060841 | 0.70 | 0.13 | −0.282835 |
| 0.20 | 0.01 | −0.081110 | 0.75 | 0.15 | −0.302847 |
| 0.25 | 0.01 | −0.101370 | 0.80 | 0.17 | −0.322817 |
| 0.30 | 0.02 | −0.121617 | 0.85 | 0.19 | −0.342741 |
| 0.35 | 0.03 | −0.141850 | 0.90 | 0.22 | −0.362614 |
| 0.40 | 0.04 | −0.162065 | 0.95 | 0.24 | −0.382432 |
| 0.45 | 0.05 | −0.182261 | 1.00 | 0.27 | −0.402192 |
| 0.50 | 0.06 | −0.202433 | 2.00 | 1.28 | −0.773993 |

FIG. 3 (not to scale) illustrates a Fresnel lens 8 having an optical axis $X_3$–$X_3$ and a face 9 formed according to equation (1). The lens 8 bears an echelon system 10 having active flanks 11. The image-side face 12 of the Fresnel lens is part of a sphere about a center 13.

The following table II shows the optical data of the Fresnel lens 8. In the table, the values $h$ and $p$ from echelon to echelon are indicated in steps of 0.05 mm., but when the axial distance is greater than 1 mm., these values are shown in steps of 1 mm. The echelon sizes are given for the purpose of keeping the table within reasonable limits. The Fresnel lens 8 has a thickness of 1.98 mm. and an index of refraction $n'=1.5$. The radius of curvature of the face 12 is 23.72 mm. The heights $h$ are stated as positive or negative according to which side of the optical axis $X_3$–$X_3$ they are. If infinity is imaged, $\alpha'$ 0. The distances of image points not at infinity may have any values. The product $\alpha' \cdot \Delta s$, which becomes $\Delta s'$, is very small.

TABLE II

| ±h | −p | tan φ | ±h | −p | tan φ |
|---|---|---|---|---|---|
| 0.05 | 0.00007 | 0.0058366 | 2.00 | 0.116 | 0.2338189 |
| 0.10 | 0.0003 | 0.0116732 | 3.00 | 0.257 | 0.3514048 |
| 0.15 | 0.0007 | 0.0175099 | 4.00 | 0.450 | 0.4698225 |
| 0.20 | 0.001 | 0.0233467 | 5.00 | 0.690 | 0.5893768 |
| 0.25 | 0.002 | 0.0291836 | 6.00 | 0.971 | 0.7103867 |
| 0.30 | 0.003 | 0.0350206 | 7.00 | 1.291 | 0.8331804 |
| 0.35 | 0.004 | 0.0408579 | 8.00 | 1.642 | 0.9580684 |
| 0.40 | 0.005 | 0.0466954 | 9.00 | 2.023 | 1.0854383 |
| 0.45 | 0.006 | 0.0525332 | 10.00 | 2.429 | 1.2155508 |
| 0.50 | 0.007 | 0.0583713 | 11.00 | 2.858 | 1.3487380 |
| 0.55 | 0.009 | 0.0642097 | 12.00 | 3.306 | 1.4853004 |
| 0.60 | 0.011 | 0.0700485 | 13.00 | 3.77217691 | 1.6255205 |
| 0.65 | 0.012 | 0.0758876 | 14.00 | 4.25425741 | 1.7696486 |
| 0.70 | 0.014 | 0.0817272 | 15.00 | 4.75101736 | 1.9178862 |
| 0.75 | 0.016 | 0.0875673 | 16.00 | 5.26137025 | 2.0703898 |
| 0.80 | 0.019 | 0.0934079 | 17.00 | 5.78447031 | 2.2273528 |
| 0.85 | 0.021 | 0.0992490 | | | |
| 0.90 | 0.024 | 0.1050906 | | | |
| 0.95 | 0.026 | 0.1109329 | | | |
| 1.00 | 0.029 | 0.1167758 | | | |

The inclinations of the flanks 6 and 7 of the echelon systems 4 and 5, respectively, relative to the axis $X_2$–$X_2$ (FIG. 2) and the inclinations of the active flanks 11 of the echelon system 10 relative to the axis $X_3$–$X_3$ (FIG. 3) are defined by the equation (2).

I claim:

1. A Fresnel lens for producing an aberrationless image of any two points of its optical axis, comprising two optically active faces and a Fresnel system at each of said faces, the meridional section of each of said faces having a form defined by the equation $$+(h+\alpha'\Delta s \sin\sigma'\cos\sigma')\sqrt{1+\frac{\alpha'^2(\Delta s)^2 \sin^4\sigma'}{(h+\alpha'\Delta s \sin\sigma'\cos\sigma')^2}} \cdot \frac{n'(h\sin\epsilon' + \alpha'\Delta s \sin\sigma' \sin\varphi)}{}$$

$$-\frac{n(h\sin\epsilon + \Delta s \sin\sigma \sin\varphi)}{(h-\Delta s \sin\sigma\cos\sigma)\sqrt{1+\frac{(\Delta s)^2 \sin^4\sigma}{(h+\Delta s \sin\sigma\cos\sigma)^2}}} = 0$$

wherein:
$h$ = height of beam incidence on Fresnel face,
$n$ = refractive index in object space,
$n'$ = refractive index in image space,
$\Delta s$ = distance apart of object points in optical axis,
$\alpha'$ = depth-of-field image scale,
$\epsilon$ = angle of beam incidence on Fresnel face,
$\epsilon'$ = angle of refraction on Fresnel face,
$\sigma$ = object-side aperture angle,
$\sigma'$ = image-side aperture angle, and
$\Phi$ = inclination of active flanks of Fresnel echelons.